United States Patent Office 2,771,462
Patented Nov. 20, 1956

2,771,462

METHOD FOR MAKING CERTAIN N-SUBSTITUTED POLYVINYL HETEROCYCLICS

Kwan-Ting Shen, Brentwood, Mo., assignor to Petrolite Corporation, Wilmington, Del., a corporation of Delaware No Drawing. Application December 8, 1952, Serial No. 324,812

8 Claims. (Cl. 260—88.3)

This invention is concerned with a new, novel and improved method of making certain polymerized N-substituted polyvinyl heterocyclics. Said polymerized N-substituted polyvinyl heterocyclics have utility in various arts and are particularly effective as demulsifiers for oil-in-water emulsions as described in my co-pending application, Serial No. 324,813, filed December 8, 1952.

More specifically, the present invention is concerned with a method for preparing polymeric quaternary ammonium salts from nitrogen-containing vinyl-substituted heterocyclic compounds; the particular reactant being a member selected from the class consisting of vinyl pyridine, vinyl pyrazine, vinyl piperidine, vinyl quinoline, alkylated vinyl pyridine, alkylated vinyl pyrazine, alkylated vinyl piperidine, and alkylated vinyl quinoline; and said method involving reaction between the aforementioned vinyl heterocyclic compounds and a monocarboxylic acid having a reactive halogen; said reactants being combined in substantially a mole-for-mole ratio; said method involving at various stages the following type reactions; salt formation, polymerization, quaternization and decarboxylation. In the case of piperidine two moles of a halogen acid may be used.

It is well known to those skilled in the art that vinyl substituted heterocyclics, such as vinyl pyridine, vinyl pyrazine, vinyl piperidine, vinyl quinoline, and the like, can be caused to polymerize under the influence of heat and catalyst to produce chain polymers of the type

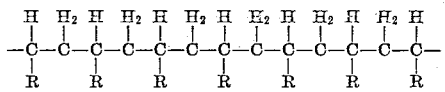

wherein R is a cyclic nitrogen-containing structure such as pyridine, pyrazine, piperidine, quinoline, etc.

It is also well known to those skilled in the art that polymers of the aforementioned type may be reacted with halogen-containing compounds such as ethyl bromide to introduce substituents on the ring nitrogen, thus forming either a tertiary amino group or a quaternary amino compound. These chain polymers with a plurality of nitrogen-containing groups are useful for a wide variety of purposes, which will be discussed subsequently. In the preparation of these materials as outlined above a two-step process is usually required. First, the vinyl heterocyclic must be polymerized, and then the modification of the amino group must be performed. In some cases the amino modification can be carried out first and then the polymerization performed, but in either case two separate steps are involved.

The amine modification step involves the use of halogenated compounds that are relatively expensive and results in the elimination of halogen acid which sometimes introduces corrosion problems in the equipment. The polymerization step must be carried out under careful control in the presence of suitable catalysts. Both these steps are expensive and time-consuming.

In the method described in the present invention, both these steps are carried out simultaneously in a manner which leads to significant simplification of the process and the necessary equipment. For purpose of convenience, what is said subsequently will be divided into five parts:

Part 1 is concerned with a description of the nitrogen-containing heterocyclic vinyl-substituted compounds that may be used as one of the initial reactants in the practice of the present invention;

Part 2 is a description of the alpha-halogen carboxylic acids and their equivalents which may be used to perform the described modification and polymerization of the previously specified vinyl compounds;

Part 3 is a description of the new and novel method employed in the preparation of the herein described polymers;

Part 4 is concerned with a discussion of the possible mechanism of the reaction involved in the herein described new and novel method of preparation of these polymers; and Part 5 is concerned with uses to which the products resulting from the practice of the previously described new and novel method may be applied.

PART 1

One type of initial reactant which may be used in the preparation of the herein described compounds has been characterized previously for purposes of convenience as a nitrogen-containing vinyl-substituted heterocyclic. By "nitrogen-containing vinyl-substituted heterocyclic" is meant any chemical compound which has as a part of its structure a ring system containing nitrogen as a part of the cyclic system, and further has as a substituent upon this cyclic unit a vinyl or sometimes substituted vinyl group. This general specification includes a diverse group of materials. For instance, the heterocyclic ring may be an essentially aromatic ring such as pyridine or pyrazine, a fused ring system such as quinoline, or a non-aromatic ring such as piperidine. The essential structural element is the presence of one or more nitrogen atoms in the cyclic structure which are capable of entering into reaction with halogen atoms from the halogenated carboxylic acids to produce substituted nitrogen atoms or quaternary compounds. Further, there should be as a substituent on the ring a vinyl or substituted vinyl group capable of inducing in the molecule a tendency toward polymerization by the usual vinyl polymerization mechanisms.

For specific information on the preparation of vinyl pyridines reference is made to U. S. 2,512,660, dated June 27, 1950, to Mahan, or U. S. Patent 2,556,845, dated June 12, 1951, to Kauffman. The preparation of these compounds has been repeatedly discussed in the chemical literature and further reference is made to the articles by Einhorn and Lehnkering, Ann. 246, 172 (1888), and by Methner, Ber. 27, 2689 (1894), or to the article by Iddles et al., JACS 59, 1945–6 (1937). For the preparation of vinyl piperidines reference is made to the previously cited article by Iddles, or to Landenburg: Ber. 22, 2487 (1889). The preparation of vinyl quinolines is described in an article by G. B. Bachman, et al.: JACS. 70, 2381–4 (1948). L. J. Kitchen et al., in an article in JACS. 69, 854 (1947), and in an article in JACS. 73, 1838 (1951) describes the preparation of the vinyl pyrazines.

The following specific examples of compounds which may be employed for the purpose previously specified in this section are cited by way of illustration and are not to be construed as limiting the scope of the invention.

Example 1a

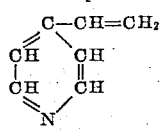

4-vinyl pyridine

Example 2a

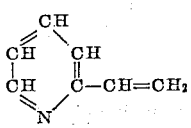

2-vinyl pyridine

Example 3a

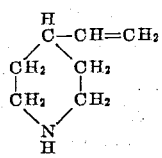

4-vinyl piperidine

Example 4a

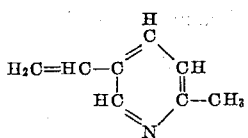

2-methyl-5-vinyl pyridine

Example 5a

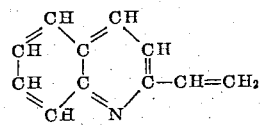

2-vinyl quinoline

Example 6a

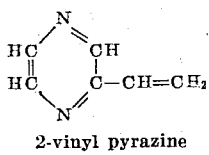

2-vinyl pyrazine

The preceding six examples illustrate a number of suitable compounds which are particularly suited for use in the present invention. However, other well known compounds can be scubstituted for these particular ones without departing from the spirit of the invention.

PART 2

In the utilization of the herein contemplated method of preparation of the previously described polymers, nitrogen-containing vinyl-substituted heterocyclics are reacted with alpha-halogen carboxylic acids of the general type

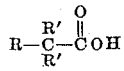

where R is a member of the class consisting of hydrogen atoms and hydrocarbon radicals such as methyl, ethyl, and other lower straight chain or branches radicals, and R' is selected from the class consisting of hydrogen, chlorine, fluorine, bromine and iodine, with the proviso that there must be at least one occurrence of the halogen atom. Trichloroacetic acid may be used in which case, of course, R and both occurrences of R' represent chlorine. Other comparable halogen acids, such as tribromoacetic acid, can be used. Specific examples of the compounds which I prefer to employ are alpha chloroacetic acid, and particularly alpha-halogen carboxylic acids having not over 6 carbon atoms. Other suitable reactants, some of which contain over 6 carbon atoms, include alpha-chloropropionic acid, alpha-chlorobutyric acid, bromoacetic acid, dichloroacetic acid, alpha-chlorostearic acid, alpha-chloro oleic acid, alpha-bromo stearic acid, and alpha-bromo oleic acid.

It is my preference to use the chloro derivatives since they are commercially available. However, the bromo, iodo, and fluoro derivatives may be used if desired. The essential requirements are that the carboxylic acid be substituted with at least one reactive halogen and preferably on the alpha carbon atom and that the hydrocarbon residue be of such a nature that stearic hindrance does not block the reactivity of the halogen.

Attention is again directed to the fact that in the claims reference to substantially mole-for-mole ratio is intended to include also the exceptional instance of piperidine which, as a matter of fact, can react with 2 moles of the halogenated acid instead of a single mole. If one attempted more specific cognizance in the hereto appended claims further complication would be added which would not be worth while. The use of two such moles of acid does not depart from the spirit of the invention. Likewise, as has been pointed out, substantially less than a mole of acid can be employed and part of the nitrogen groups in the initial polymer be left unconverted.

PART 3

The employment of the new and novel method for the preparation of the above mentioned polymers is comparatively simple. It involves nothing more than adding the two types of reactants in substantially stoichiometric proportions. The reaction ordinarily starts readily at room temperature or with only the most moderate heating. An exothermic reaction ensues with the evolution of gas and the formation of a light colored voluminous solid. The solid is the desired end product and is readily soluble in water. The procedure may be illustrated by the following examples:

Example 1b

One-half gram mole (52.5 grams) of 4-vinyl pyridine is added dropwise to one-half gram mole (47.3 grams) of finely pulverized chloroacetic acid in an open reactor, equipped with a stirring device. The temperature of the reactants, initially, was about 23° C. As the 4-vinyl pyridine is added to the acid the temperature of the mixture rises and soon a vigorous reaction ensues with the evolution of a gas. As the polymerization proceeds to the point where a solid material is formed, the escaping gas causes the viscous liquid to foam and a voluminous, fluffy, fragile solid results. If a portion of this solid is placed in water it readily dissolves to produce a clear, red solution.

As further examples of reactant combinations which may be used, the following list is included. Since the exact reaction mechanism and the degree of polymerization is incompletely known, these materials are best characterized by a designation of their reactive components.

Example 2b 105 grams of the heterocyclic compound described as Example 1a are reacted with 153 grams of alpha-bromopropionic acid in the same manner as described in Example 1b, preceding.

Example 3b 105 grams of the heterocyclic compound described as Example 2a are reacted with 94.5 grams of chloroacetic acid in the same manner as described in Example 1b, preceding.

Example 4b 119 grams of the heterocyclic compound described as Example 4a are reacted with 94.5 grams of chloroacetic acid in the same manner as described in Example 1b, preceding.

Example 5b 155 grams of the heterocyclic compound described as Example 5a are reacted with 139 grams of bromoacetic acid in the same manner as described in Example 1b, preceding.

Example 6b 105 grams of the heterocyclic compound described as Example 2a are reacted with 114 grams of trifluoroacetic acid in the same manner as described in Example 1b, preceding.

I prefer to use heterocyclic compounds which have only one ring and particularly pyridine and pyridine derivatives as, for example, monoalkylated or dialkylated vinyl pyridine. My preference is that the alkyl group be a low molal group having not over 6 carbon atoms and generally one or 2 carbon atoms such as a methyl group or ethyl group. If alkylated, it is my preference that the vinyl pyridine be monoalkylated, such as monomethylated or monoethylated vinyl pyridine.

PART 4

From a consideration of the known properties and reactions of the vinyl heterocyclics herein previously described, it is believed that the products produced from the method herein described are of the type:

$$-\underset{R}{\overset{H}{\underset{|}{C}}}-\underset{R}{\overset{H_2}{\underset{|}{C}}}-\underset{R}{\overset{H}{\underset{|}{C}}}- \quad (\underset{R}{\overset{H_2}{\underset{|}{C}}}-\overset{H}{\underset{|}{C}})_n \quad -\underset{R}{\overset{H_2}{\underset{|}{C}}}-\overset{H}{\underset{|}{C}}-\overset{H_2}{\underset{|}{C}}-\overset{H}{\underset{|}{C}}-\overset{H}{\underset{|}{C}}-$$

with terminal ending CH₃ or CH₂R although ring compounds also may be formed, where R is a nitrogen-containing heterocyclic derived from the compounds described in Part 1, and $n$ is a numeral of indeterminate size, and in the preferred embodiment is probably less than 20. Sometimes in an idealized formula such as the above an effort is made to speculate as to the terminal groups. Under such circumstances the terminal groups might be CH₃ or CH₂R. However, ring compounds cannot be ruled out and if formed, then it would be inappropriate to show terminal radicals with the valencies completely satisfied.

It is further believed that the nitrogen-containing heterocyclic residue designated by R above has within its structure a grouping selected from the class consisting of $$\left[-\overset{R''}{\underset{|}{N}}-\right]^{+} \left[R'\right]^{-}$$

and $$\left[-\overset{R''}{\underset{|}{N}}=\right]^{+} \left[R'\right]^{-}$$

where R" is a hydrocarbon residue of one less carbon than the halocarboxylic employed, and R' is a halogen.

Although the present invention is concerned with polymeric quaternary ammonium compounds it is obvious, when a polymeric compound of the kind described is reacted with chloroacetic acid or the like, that the majority of the ring structures are probably converted into the quaternary salt but some may not be, i. e., they remain unaltered or perhaps are converted to a tertiary group.

In the hereto appended claims reference to quaternization is not limited necessarily to complete quaternization but may include instances where a significant majority of nitrogen groups have been so converted.

On the basis of the present evidence it is believed that the reaction proceeds as will be described hereinafter. For purposes of clarity and simplicity the reactants of Example 1b will be used. This is not to be construed as limiting the scope of the method and it should be noted that analogous mechanism diagrams can be written for any of the other indicated reactant combinations.

When the nitrogen-containing vinyl heterocyclic is added to the acid the first step is believed to be salt formation between the acid and the nitrogen-containing group, thus:

$$R-\underset{R'}{\overset{R'}{\underset{|}{C}}}-\overset{O}{\overset{\|}{C}}OH + N\diagup \longrightarrow \left[R-\underset{R'}{\overset{R'}{\underset{|}{C}}}-\overset{O}{\overset{\|}{C}}O\right]^{-}\left[HN\diagup\right]^{+}$$

Acid     Base           Salt

This reaction is known to be exothermic and the heat evolved is then believed to initiate the polymerization of the salt through the vinyl grouping, thus:

$$\begin{array}{c}\text{[polymerization diagrams]}\end{array}$$

This polymerizaion through the ethylenic (vinyl) linkage is known also to be highly exothermic. It should be noted now that in the formation of the salt previously described the alpha halogen atom is brought into direct proximity with the nitrogen-containing group. On the basis of evidence to be cited hereinafter it is believed that the heat from the vinyl polymerization causes a reaction between the halogen and the nitrogen containing group, thus $$\begin{array}{c}\text{[reaction diagram]}\end{array}$$

Salt            Quaternary

This quaternary salt is then decarboxylated by the heat of reaction to give:

$$\left[\begin{array}{c}H\\R\overset{|}{C}-\!\!-\!\!-\!\!-N\diagup\\ \underset{|}{|}\\ O=C-O\,H\end{array}\right]^{+} + R'^{-} \longrightarrow \left[\begin{array}{c}H\\R\overset{|}{\underset{|}{C}}-N\diagup\\H\end{array}\right]^{+} + R'^{-} + CO_2$$

The overall course of the reaction is, then, postulated as:

(a) Salt formation
(b) Polymerization
(c) Quaternization
(d) Decarboxylation

There is ample experimental evidence to support this postulate. Salt formation between nitrogen-containing groups and acids is well substantiated. It has been clearly demonstrated also that polymerization of substituted vinyl compounds takes place through the ethylenic leakages in the manner described and that this reaction is highly exothermic. Quaternization of nitrogen-containing groups by the reaction with halogens is well known, also. Further in the specific reaction described above, if silver nitrate is added to the water solution of the final polymer, a precipitate of the silver halide will form instantly. This clearly shows that the halogen is in the form of a negative ion.

If the gas evolved in the previously described reaction is passed through an aqueous solution of barium hydroxide, a white precipitate is formed which, when washed, dried, and treated with hydrochloric acid, evolves carbon dioxide. This is strong evidence in favor of the postulated decarboxylation.

The final product of the method of this invention is believed to be a polymer of indeterminate size, perhaps in some instances as much as 100 units or more, and in other instances perhaps less than 20 units. Each unit, of course, has a substituted nitrogen atom in the heterocyclic ring. To the extent that choice is possible polymers having less than 20 units are preferred.

It is possible that in addition to producing products which have been obtained by other procedures I do obtain, in part, entirely new chemical compounds by using the described method. If such compounds are obtained I know of no procedure which will isolate them from the cogeneric mixture. Furthermore, it appears that following the method described one would expect to obtain, and perhaps does obtain, to some degree an alkyl halide such as methylchloride. In any event and to further indicate the possible nature of the reaction and to shed further light on the same, attention is directed to the reaction between pyridine and chloroacetic acid with the formation of pyridine betane hydrochloride which decomposes at 202°–205° C., giving carbon dioxide methyl chloride, and pyridine.

PART 5

As previously indicated, the polymeric quaternary salts obtained as herein described have utility in various arts and are particularly effective as demulsifiers for oil-in-water type emulsions as described in my co-pending application, Serial No. 324,813, filed December 8, 1952. However, these products are valuable additionally for various purposes for which quaternary compounds of the surface-active or nonsurface-active type are used as, for example, as bacteriostatic agents, algaecides, and for prevention of objectionable microorganic growths of various kinds. In some instances they appear to be effective in stopping or retarding the growth of fungus, molds, etc.

It is believed the fact that these compounds can be made cheaply and efficiently by the method described previously will enhance their likelihood of employment in various fields of commercial application in addition to resolution of oil-in-water type emulsions.

Having thus described my invention, what I claim as new and desire to secure by Letters Patent, is:

1. A method for preparing polymeric quaternary ammonium salts from nitrogen-containing vinyl-substituted heterocyclic compounds which comprises slowly adding a carbon-vinyl-substituted heterocyclic compound selected from the class consisting of vinyl pyridine, vinyl pyrazine, vinyl piperidine, vinyl quinoline, alkylated vinyl pyridine, alkylated vinyl pyrazine, alkylated vinyl piperidine, and akylated vinyl quinoline to a monocarboxy acid having a reactive halogen attached to the alpha carbon atom which alpha carbon atom in turn is linked to a third atom selected from the class consisting of hydrogen and carbon atoms, and a fourth atom selected from the class consisting of hydrogen and halogen atoms, the reaction system consisting essentially of the reactants and the resultants of reaction.

2. A method for preparing polymeric quaternary ammonium salts from nitrogen-containing vinyl-substituted heterocyclic compounds which comprises slowly adding a carbon-vinyl-substituted heterocyclic compound selected from the class consisting of vinyl pyridine, vinyl pyrazine, vinyl piperidine, vinyl quinoline, alkylated vinyl pyridine, alkylated vinyl pyrazine, alkylated vinyl piperidine, and alkylated vinyl quinoline to a monocarboxy acid having not over 6 carbon atoms and having a reactive halogen attached to the alpha carbon atom which alpha carbon atom in turn is linked to a third atom selected from the class consisting of hydrogen and carbon atoms and a fourth atom selected from the class consisting of hydrogen and halogen atoms, the reaction system consisting essentially of the reactants and the resultants of reaction.

3. The method of claim 2 wherein the reactive halogen is chlorine.

4. The method of claim 2 wherein the halogenated acid is a chloroacetic acid composed of chlorine, carbon, hydrogen and oxygen.

5. The method of claim 2 wherein the halogenated acid is monochloroacetic acid.

6. The method for preparing polymeric quaternary ammonium salts from a vinyl-substituted pyridine compound of the formula

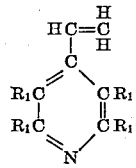

wherein $R_1$ is a member selected from the class consisting of hydrogen atoms and alkyl radicals which comprises slowly adding the aforementioned pyridine compound to monochloroacetic acid in substantially a mole-for-mole ratio, the reaction system consisting essentially of the reactants and the resultants of reaction.

7. The method for preparing polymeric quaternary ammonium salts from a vinyl-substituted pyridine compound of the formula

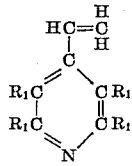

wherein $R_1$ is selected from the class consisting of hydrogen atoms and low molal alkyl radicals having not more than 6 carbon atoms which comprises slowly adding the aforementioned pyridine compound to monochloroacetic acid in substantially a mole-for-mole ratio, the reaction system consisting essentially of the reactants and the resultants of reaction.

8. A method of preparing polymeric quaternary ammonium salts from mono-vinyl-substituted pyridine and monochloroacetic acid which comprises slowly adding the monovinyl-carbon-substituted pyridine to monochloroacetic acid in substantially a mole-for-mole ratio, the reaction system consisting essentially of the reactants and the resultants of reaction.

References Cited in the file of this patent

UNITED STATES PATENTS

| | | |
|---|---|---|
| 2,487,829 | Richards | Nov. 15, 1949 |
| 2,491,472 | Harmon | Dec. 20, 1949 |
| 2,611,763 | Jones | Sept. 23, 1952 |

FOREIGN PATENTS

| | | |
|---|---|---|
| 692,417 | Germany | June 19, 1940 |